United States Patent
Nochta et al.

(10) Patent No.: US 7,725,577 B2
(45) Date of Patent: May 25, 2010

(54) METHOD AND SYSTEM TO ADAPTIVELY MANAGE THE QUALITY OF SERVICE OF INTERACTIONS BETWEEN SMART ITEM NETWORKS AND ENTERPRISE APPLICATIONS

(75) Inventors: Zoltan Nochta, Karlsruhe (DE); Ulf Brackmann, Mannheim (DE)

(73) Assignee: SAP AG, Walldorf (DE)

( * ) Notice: Subject to any disclaimer, the term of this patent is extended or adjusted under 35 U.S.C. 154(b) by 520 days.

(21) Appl. No.: 11/496,350

(22) Filed: Jul. 31, 2006

(65) Prior Publication Data

US 2008/0028068 A1 Jan. 31, 2008

(51) Int. Cl.
*G06F 15/173* (2006.01)

(52) U.S. Cl. .................. 709/224; 370/252; 370/401; 713/153

(58) Field of Classification Search ........... 709/224
See application file for complete search history.

(56) References Cited

U.S. PATENT DOCUMENTS

| 5,081,575 | A | | 1/1992 | Hiller et al. |
| 5,822,523 | A | * | 10/1998 | Rothschild et al. ........ 709/236 |
| 6,044,080 | A | * | 3/2000 | Antonov .................. 370/401 |
| 6,341,371 | B1 | | 1/2002 | Tandri |
| 6,578,068 | B1 | | 6/2003 | Bowman-Amuah |
| 6,658,473 | B1 | | 12/2003 | Block |
| 6,718,358 | B1 | | 4/2004 | Bigus |
| 6,904,110 | B2 | | 6/2005 | Trans |
| 6,988,102 | B2 | | 1/2006 | Rossiter |
| 7,051,098 | B2 | | 5/2006 | Masters |
| 2003/0191795 | A1 | | 10/2003 | Bernardin et al. |
| 2003/0227392 | A1 | * | 12/2003 | Ebert et al. ............ 340/825.49 |
| 2005/0128954 | A1 | * | 6/2005 | Li et al. .................. 370/252 |
| 2005/0252971 | A1 | | 11/2005 | Howarth et al. |
| 2006/0010243 | A1 | | 1/2006 | DuRee |
| 2006/0075087 | A1 | | 4/2006 | Kaiser |
| 2006/0143439 | A1 | * | 6/2006 | Arumugam et al. ......... 713/153 |

FOREIGN PATENT DOCUMENTS

| JP | 2006-044162 | 2/1994 |
| JP | 2007-282014 | 10/2007 |
| WO | WO9939480 A2 | 8/1999 |

OTHER PUBLICATIONS

Firoiu, V. et al., "Theories and Models for Internet Quality of Services", Proceedings of the IEEE, 90(9), (Sep. 2002),1565-1591.

(Continued)

*Primary Examiner*—Vivek Krishnan
(74) *Attorney, Agent, or Firm*—Brake Hughes Bellermann LLP (57) ABSTRACT

A quality of service parameter associated with message traffic transmitted from a smart items infrastructure through a middleware message routing engine to one or more enterprise applications is monitored. In response to the monitored quality of service parameter, a number of parallel message processors that route messages from the plurality of smart items to the message routing engine is controlled.

20 Claims, 6 Drawing Sheets

OTHER PUBLICATIONS

Search Report of European Patent Application No. 07014725 dated Nov. 20, 2007.
Cisco Systems, Inc., "Cisco Application-Oriented Networking", (Mar. 2006).
Rajani Muraleedharan and Lisa A. Osadciw, "Robustness of predictive sensor network routing in fading channels, " Proceedings of SPIE, vol. 5819 "Digital Wireless Communications VII and Space Communication Technologies," Raghuveer M. Rao, Sohail A. Dianat, Michael D. Zoltowski, Rabindra Singh, Susan P. Miller, Editors, Jun. 2005, pp. 261-272.
Muraleedharan, Rajani, et al., "Robustness of Predictive Sensor Network Routing in Fading Channels", Department of Electrical Engineering and Computer Science, Syracuse University, (Jan. 2003).
"Office Action received for European Patent Application Serial No. 07 014 725.1 mailed Mar. 20, 2009", 3 pages.

* cited by examiner

METHOD AND SYSTEM TO ADAPTIVELY MANAGE THE QUALITY OF SERVICE OF INTERACTIONS BETWEEN SMART ITEM NETWORKS AND ENTERPRISE APPLICATIONS

TECHNICAL FIELD

This description relates sensor networks and, more particularly, to managing the quality of service of interactions between sensor networks and enterprise applications.

BACKGROUND

Smart item technologies may include, for example, radio-frequency identification (RFID) systems, embedded systems, sensor motes, and/or smart item networks, and may be used, for example, to provide business software applications with fast access to real-world data. For example, smart item technologies may be used support the detection, reading, or writing of RFID tags, as well as to support communication with, and control of, wireless smart item networks and embedded systems. In many instances, smart items may include devices that have local processing power, memory, and/or communication capabilities, and that are capable of providing data about the device and its properties, or information about a current state or environment of the smart item devices. Accordingly, some such devices may be used in the execution of service components of backend or underlying enterprise applications, and, in particular, may do so in a collaborative way, e.g., by forming mobile ad-hoc networks to collect, process, or transmit data.

Examples of smart item devices include RFID tags, which may be passive or active, and which may be attached to a real-world object and used to provide product or handling information related to the object. Other examples of smart item devices includes transceivers, for example, various sensors, such as, environmental sensors (e.g., a temperature, humidity, or vibration sensor), which, as just referenced, may be capable of communicating to form one or more smart item networks. For example, sensors within a sensor network may send messages autonomously without being triggered to send a message. These and other types of smart item devices also may include embedded systems, which may refer generally to any system in which a special-purpose processor and/or program is included, and/or in which the system is encapsulated in the device being controlled.

Through automatic real-time object tracking, smart item technology may provide businesses with accurate and timely data about business operations, and also may help streamline and automate the business operations. Accordingly, cost reductions and additional business benefits (e.g., increased asset visibility, improved responsiveness, and extended business opportunities) may be obtained.

In some scenarios, data received from smart items may be received from a large number of smart items and provided to a number of different backend or underlying enterprise applications that can use the data for a variety of different analyses, functions, and business processes. Each backend application may require the receipt of messages in different incompatible formats, which may pose challenges when a large number of smart items messages are received and provided to the different backend applications.

SUMMARY

In a first general aspect, a method includes monitoring a quality of service parameter associated with message traffic transmitted from a smart items infrastructure through a middleware message routing engine to one or more enterprise applications, and controlling, in response to the monitored quality of service parameter, a number of parallel message processors that route messages from the plurality of smart items to the message routing engine.

In another general aspect, a computer program product, tangibly embodied on computer-readable media, includes computer-executable instructions for causing a data processing apparatus to monitor a quality of service parameter associated with message traffic transmitted from a smart items infrastructure through a middleware message routing engine to one or more enterprise applications, and to control, in response to the monitored quality of service parameter, a number of parallel message processors that route messages from the plurality of smart items to the message routing engine.

In another general aspect, a system includes a plurality of message processors configured for receiving messages from a smart items infrastructure and delivering the messages to a middleware message routing engine for routing to one or more enterprise applications, a performance analyzer engine configured to monitor a quality of service parameter associated with message traffic transmitted from the smart items infrastructure through the middleware message routing engine to the one or more enterprise applications, and a message processor scheduler configured to control, in response to the monitored quality of service parameter, a number of parallel message processors that route messages from the smart items infrastructure to the message routing engine.

Implementations can include one or more of the following features. For example, the message traffic can be transmitted synchronously from the smart items infrastructure to the one or more enterprise applications. The quality of service parameter can be a rate of message throughput between the smart items infrastructure and the one or more enterprise applications. Monitoring the rate of message throughput can include comparing a current rate of message throughput to a previous rate of message throughput, and controlling the number of parallel message processors in response to the monitored rate of message throughput can include activating an additional processor if the current rate is greater than the previous rate, and de-activating a processor if the current rate is less than the previous rate. Monitoring the rate of message throughput can include comparing a current rate of message throughput to a previous rate of message throughput, and controlling the number of parallel message processors in response to the monitored rate of message throughput can include determining that a current rate of message throughput is greater than a previous rate, and, in response to this determination, activating a processor, and then, determining that a current rate of message throughput is less than a previous rate, and, in response to this determination, de-activating a processor, and then, determining that a current rate of message throughput is greater than a previous rate, and, in response to this determination, de-activating a processor. The quality of service parameter can be a rate of successful message transmission between the smart items infrastructure and the one or more enterprise applications. Payloads of a plurality of messages can be aggregated into a single message for transmission from the smart items infrastructure through the middleware message routing engine to the one or more enterprise applications.

The details of one or more implementations are set forth in the accompanying drawings and the description below. Other features will be apparent from the description and drawings, and from the claims.

DETAILED DESCRIPTION

Figure 1:
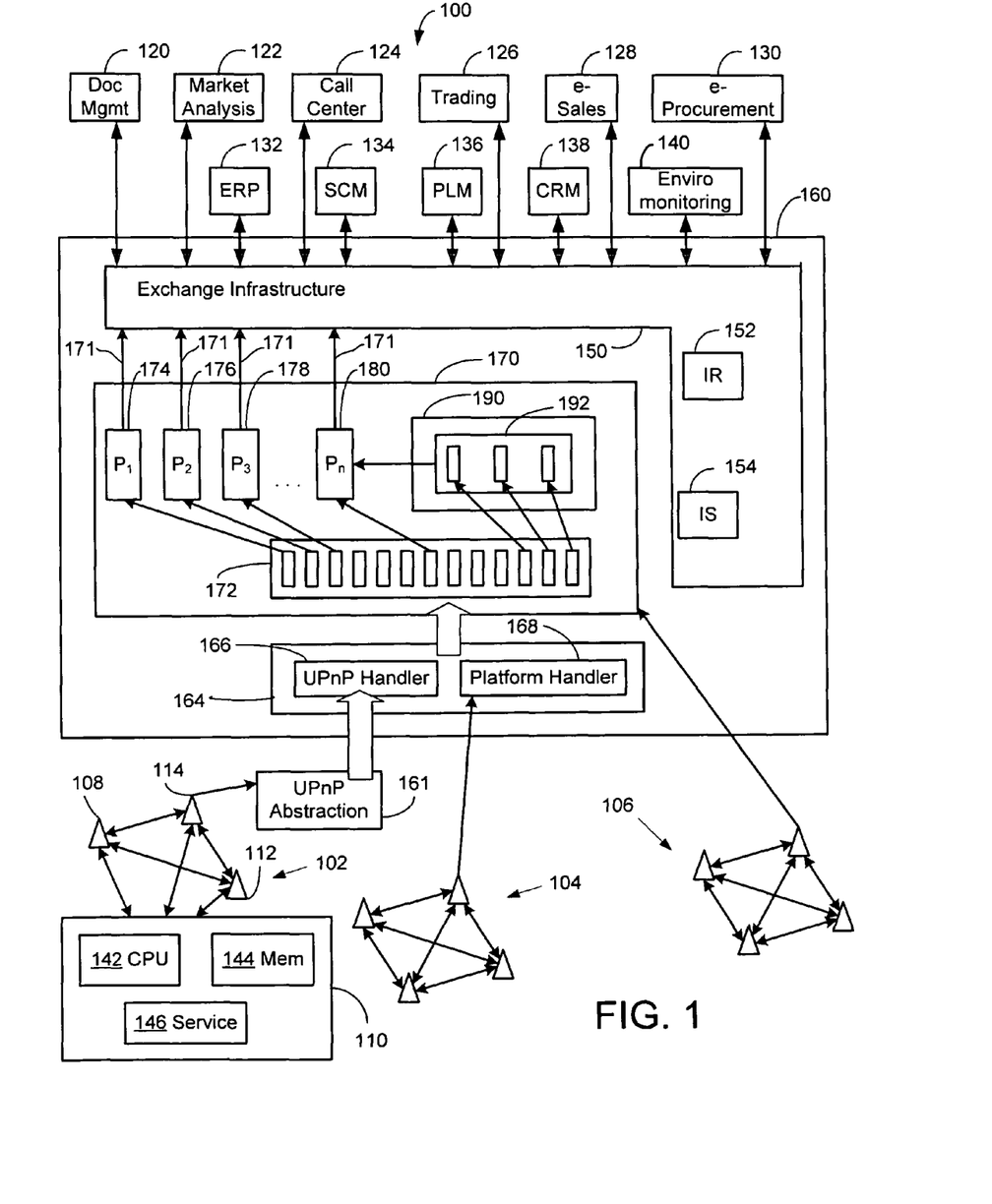
FIG. 1 is a block diagram of a system in which a number of smart item networks are configured to communicate with a number of backend enterprise applications.

FIG. 1 is a block diagram of a system 100 in which a number of smart item networks 102, 104, and 106 can communicate with a number of backend enterprise applications 120-140. In some implementations, the backend application(s) may include, for example, backend applications to provide document management services 120, market analysis services 122, call center services 124, trading services 126, electronic sales services 128, electronic procurement services 130, enterprise resource planning services 132, supply chain management services 134, product life cycle management services 136, customer resource management services 138, and monitoring and control or environmental conditions in a space 140, and any other service(s) that may be used to execute processes with respect to real-world objects, where such real-world objects may include, for example, documents, products for sale, pallets, or other shipment elements, vehicles, customers, employees, patients, tools, rooms, warehouses, buildings, or manufacturing materials/equipment. Thus, the processes, including those portions of the processes deployed and executed at the local level of the real-world objects, may be used, for example, to determine inventory levels, set pricing levels, evaluate marketing strategies, evaluate manufacturing or production technologies, reduce theft, monitor and control environmental conditions, or maintain safety.

Because backend enterprise applications 120-140 can be incompatible with each other in their native forms, a middleware layer 150 can be used to provide an infrastructure that allows technical integration of different applications and systems by using open standards, such as XML and Java. In one implementation, the middleware layer 150, can be the Exchange Infrastructure (XI) application, available from SAP AG of Walldorf, Germany. For simplicity and brevity, the middleware layer 150 at times may be referred to herein as the XI, although other middleware integration applications can also be used.

The middleware layer 150 can provide an open framework that allows the separation of integration customizing and coding (i.e., routing, mapping, etc.) from application coding. Thus, the middleware layer integrates enterprise applications 120-140 from the point of view of business logic and allows cross-system communication and provides an enterprise middleware application for scenarios in which different enterprise applications can exchange messages with each other without knowing a possible communication partner in advance. Rather than requiring a direct connection between every pair of applications 120-140, the middleware layer 150 provides a runtime infrastructure that ties together heterogeneous an avoids one-to-one connection between all possible system combinations.

The middleware layer 150 can integrate different backend applications by mapping messages received from and sent to particular applications in formats that are understandable to the particular applications. In one implementation, at design time, collaboration knowledge of business processes, mappings, and interfaces, can be configured in an integration repository 152. This information, along with configuration-specific information, can be used by the middleware layer 150 to route messages from one application to another.

An integration server 154 can receive messages from a sender application, apply routing and mapping rules to the messages, and then send the messages to the receiving application. The integration repository 152 can provide necessary data for logical and technical routing as well as mapping to the integration server 154. The integration server 154 can include a centrally-configured integration engine as well as further integration and mapping services. The integration server 154 receives XML messages, determines the receiver, performs mappings, and routes the XML messages to the respective receiver systems. In doing so, the integration server 154 is dependent on integration information that is stored in the integration repository 152.

At runtime, various mapping techniques (e.g., graphical mapping, XLST mapping, Java mapping, and ABAP mapping) can be used to transform an inbound message structure from one application to an outbound message structure destined for another application. This may be especially useful if the originating and destination systems are from different vendors with different technologies or from a single vendor but have different release versions. Various mapping techniques can be used. For example, structural mapping can transform a whole message into another message format, and value mapping can convert different value types (for example, a Boolean value can be converted to an Integer value).

Figure 2:
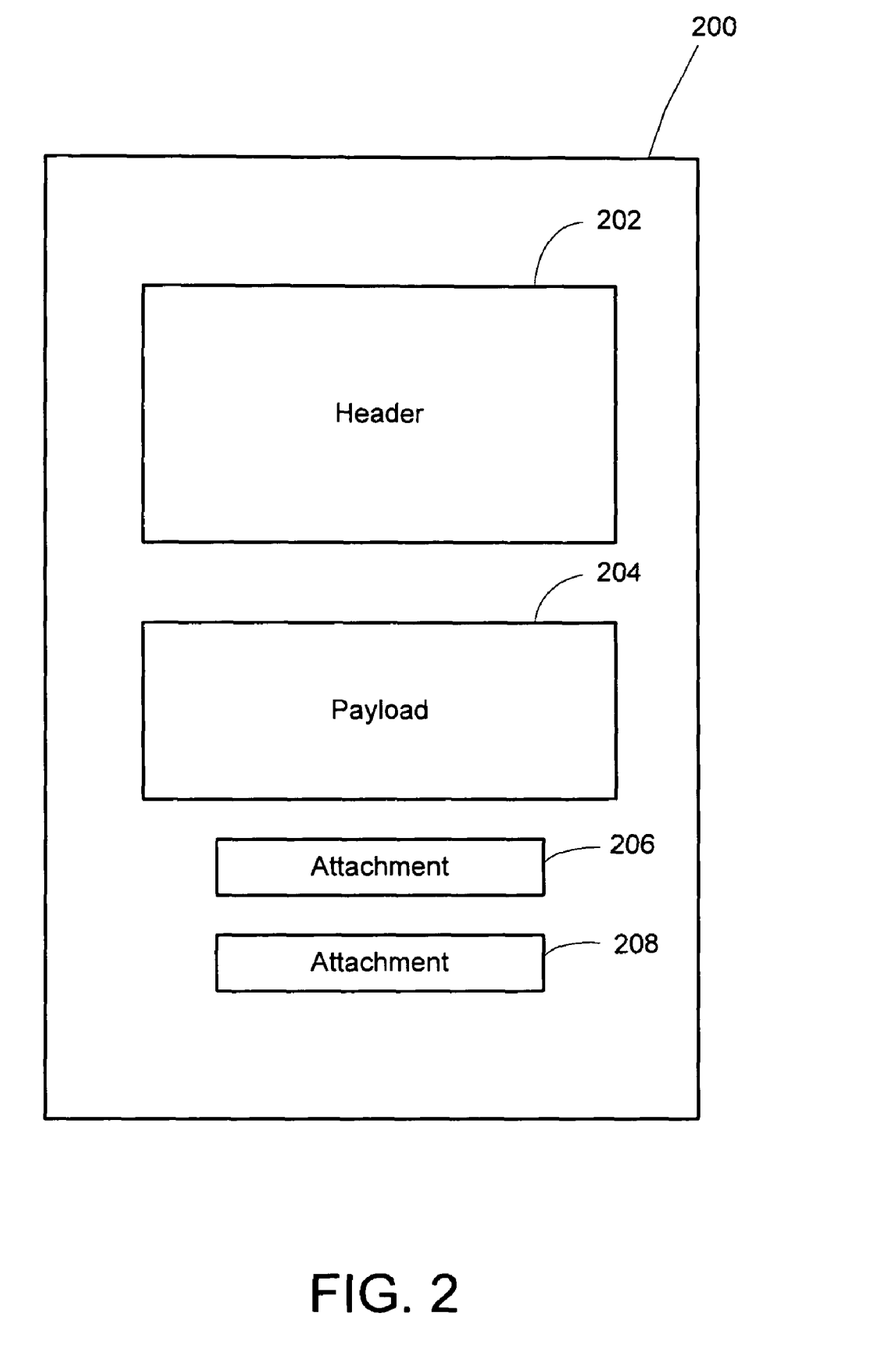
FIG. 2 is a schematic block diagram of a message that can be exchanged between applications connected to an exchange infrastructure.

FIG. 2 is a schematic block diagram of a message 200 that can be exchanged between applications connected to the middleware layer 150. Messages exchanged between enterprise applications 120-140 can be based on a particular message format, for example, XML, although messages used in the middleware layer 150 also can have binary attachments. In one implementation, the message protocol used in the middleware layer 150 can be based on the W3C note "SOAP Messages with Attachments," in which messages have a SOAP header 202, a payload 204 and optional binary attachments 206 and 208. The SOAP header 202 of a message can contain all the important information required by the middleware layer 150 to forward the message to the appropriate enterprise application, while the payload 204 can contain the actual business data. For example, if the message 200 relates to a purchase order, the business data in the payload 204 can include data about the purchase order number, the name and address of the recipient, the model number, size, color, and style of the item that was purchased, the name, address, and credit card information of the purchaser, etc. Also, an unlimited number of attachments 206 and 208 that typically include non-XML data (e.g., pictures, text documents, or binary data) can be appended to the message before the message is sent. In the example of the purchase order, an attachment 206 may include an image file of the purchaser's signature, or an attachment 208 may include a text document of a contract. Thus, messages can be rather large, for example, on the order of hundreds or thousands of lines to process. The header 202 can include message attribute data that refers to, for example, the content-type of the message, the mode of transmission (e.g., synchronous or asynchronous), and other information related to the routing of the message within the XI.

Figure 3:
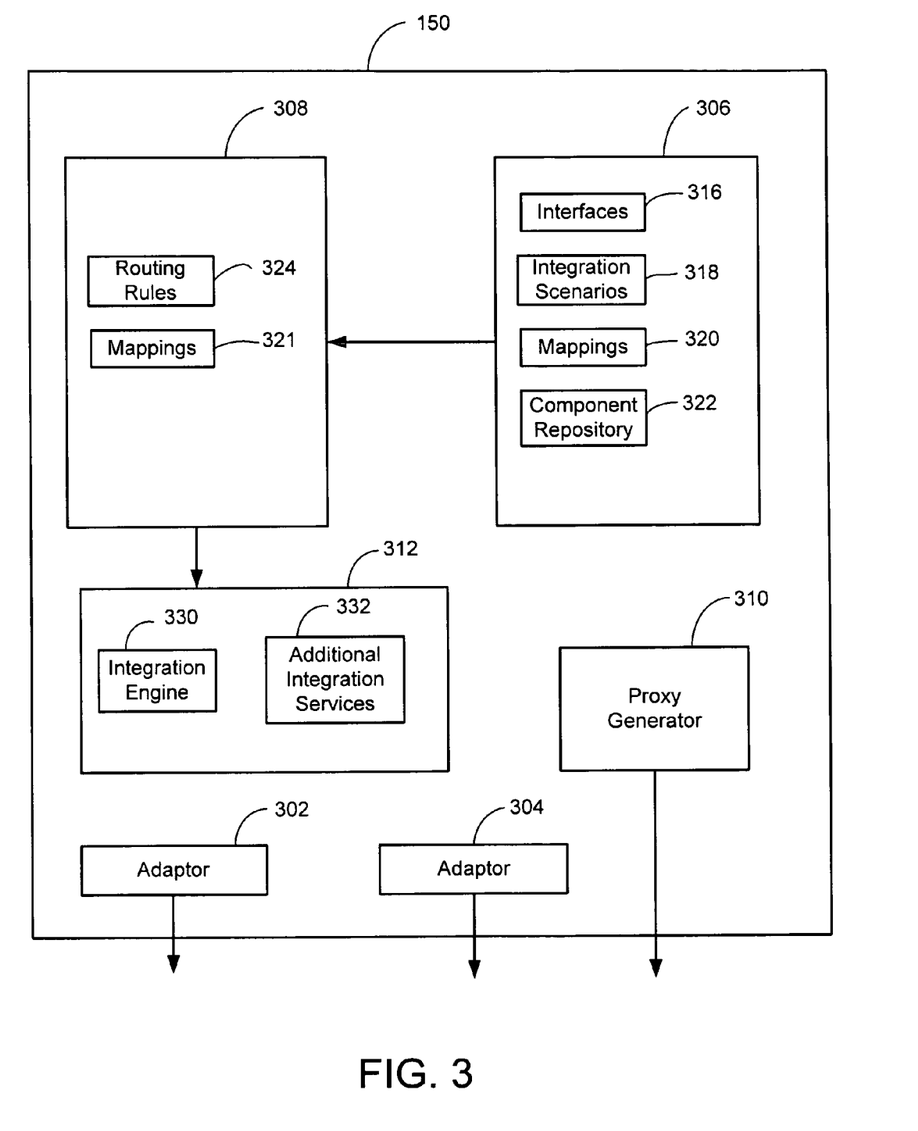
FIG. 3 is a schematic block diagram of a middleware layer that can be used to route messages between different enterprise applications.

FIG. 3 is a schematic block diagram of a middleware layer that can be used to route messages between different enterprise applications. The middleware layer 150 can be, for example, the exchange infrastructure ("XI") 150. The architecture of the XI can include adapters 302 and 304, an integration repository 306, an integration directory 308, a proxy generator 310, an integration server 312, and an integration monitor 314. Communication between the XI 150 and other systems can be based on an enhanced SOAP script language that uses the above-described messages. However, if external systems cannot support this protocol, the adapters 302 and 304 can be used to map the external protocols to SOAP.

The integration repository 306 can contain outbound and inbound interfaces 316 that can be used to interface with various enterprise applications 120-140. The repository 306 can use a standard XML language to describe services, such as WSDL. Interfaces 316 for already existing functions (e.g., BAPIs) can be generated by extractors. Prior to running the XI 150, all outbound and inbound interfaces that can be used are loaded into the integration repository 306, and if an interface is not added initially, it is added later before use. The integration repository 306 also can contain information about integration scenarios 318, mappings 320, and a component repository 322. The mappings 320 can be used to convert a message or parts of a message into another message or parts of another message, and mappings can be used with XML documents and can be performed using XSLT sheets or Java coding. The mappings 320 can be stored in a repository that contains the mapping rules for an outbound-inbound interface combination, although several mapping rules can exist for a single combination. The mappings 320 also can include a directory that contains exactly one mapping rule that is used during runtime for each combination of outbound interface, inbound interface, and message direction. The component repository 322 can contain descriptions of all applications 120-140 (i.e., their version, relations, and dependencies).

The integration directory 308 can include information about the interfaces used by a specific instance of an application 120-140 or about interfaces that are used by a specific customer. Thus, the integration directory 308 can contain the knowledge to describe integration-related parts of the configured customer landscape. Such application-specific information can be maintained by customers and used when configuring the customer's systems for their particular scenarios. The directory 308 also can include information about mappings 321 and routing rules 324. The mappings 321 in the integration directory 308 can be similar to, or the same as, the mappings 320 in the integration repository 306. The routing rules 324 can be used to determine the routing of messages in the integration server 312. During runtime, the routing rules 324 can determine which receiver application and which inbound interface must be called according to the outbound interface of the sender and the content of the message. The routing rules 324 can be defined when a specific customer configures a scenario of his system, and the routing rules can refer to routing objects, XPath expressions, or Java coding.

The proxy generator 310 can function to generate interfaces between the XI and an application 120-140. Proxies that can be used by an application to communicate with the XI can be generated according to the interfaces maintained in the integration repository 410, and can be generated in Java and ABAP. During runtime, for an outbound interface the application can call the corresponding proxy, which triggers the generation of an XML document that is sent to the receiver. For an inbound interface, the proxy framework can receive the XML document, convert it to ABAP or Java, and call the application via the corresponding proxy.

The integration server 312 can contain the centrally configured integration engine 330 as well as additional integration services 332. The integration server 312 can receive XML messages from external applications, determine the receiver of the messages, perform mappings, and route the messages to the respective receiver systems. The integration server 312 can rely on integration information stored in the integration directory 308 to perform these functions.

The integration engine 330 is the central distribution engine in the integration server 312, which processes XML messages, regardless of whether a message was sent to the integration engine using an adapter 302 or 304 or an application proxy. The integration engine 312 can include services for determining receivers (i.e., logical and technical routing) and for transforming of message contents between a sender system and a receiver system. Thus, when a message enters the XI, a logical routing service can determine the appropriate receivers and required interfaces by evaluating the corresponding routing rules 324 for the message.

A mapping service in the integration engine 330 can determine the required transformations that depend on the message, the sender, and the sender interface, as well as the receiver and the receiver interface. In the case of synchronous communication, even the message direction is relevant to appropriately transform input, output, and fault messages. After retrieving the required mapping 321 from the integration directory 308, the mapping service can then either execute XSLT mappings or Java code (or any combination in a given sequence) on the business content of the message from the sender process so that the message is understandable to the receiving process. Mapping, like logical routing can change the data structure of a message as the message traverses the XI, and therefore can have an impact performance of the XI.

Different kinds of adapters 302 and 304 can ensure connectivity of the XI 150 to different business partners, third-party systems, and proprietary solutions. For example, adaptors 302 or 304 can define interfaces for connectivity with legacy or third-party applications for which the proxy generator 310 cannot generate a proxy.

Thus, during runtime a message can flow though the integration server 312 of the XI 150 from a sender to a receiver. Initially, the sender may use a sending application to call an outbound proxy, which may cause the generation of a message as a XML document. The message can include a header and a body, where the header contains information about the sender and the outbound interface, and the body can include the outbound document. Using routing rules 324 in the integration directory 308, the integration server 312 then determines the receiver(s) of the message. After this determination, the header of the message can be modified to contain the receiver and the inbound interface. Then, using mappings 321 provided by the integration directory 308, the message can be transformed from the sender's format and values into the receiver's format and values. After this transformation; the body of the message contains the document converted to the inbound format (i.e., the structure that the receiver understands). Finally, the physical address of the receiver is determined and added to the header of the message, and the message is then sent to the receiving component system.

Referring again to the example of FIG. 1, a smart items network 100 can include various smart items or smart devices

108, 110, 112, and 114. In this context, it should be understood that the terms "smart items," "smart devices," "smart item devices," and similar terms, may be used similarly or interchangeably in various contexts. For example, the term "smart item" or "smart device" may refer to a device having local processing, storage, and communications capability, as referenced herein, or may refer to a combination of such a device and an object to which the device is affixed (e.g., a pallet containing merchandise for sale).

As part of a smart item network 102, such devices and/or device/object combinations also may be referred to as "nodes," or "network nodes" in some contexts. In the present description, the term "device" is used for brevity and consistency to refer to the described devices having the described features within the smart item network 100. However, it should be understood that the concepts described herein related to adaptively managing the quality of service of interactions between smart item networks and enterprise applications may relate to virtually any such setting.

Thus, the devices 108-114, and potentially other devices within the smart item networks 102, 104, and 106 (and other smart item networks) may provide real-world data to one or more business data processing systems, applications, or processes, in a timely and accurate manner. For example, as shown in FIG. 1, the network 102 can include, or communicate with, one or more backend applications 120, 122, 124, 126, 128, 130, 132, 134, 136, 138, and 140. Thus, the networks 102-106 may provide data to the applications, such that the data can be used by the application(s) 120-140 to perform one or more processes.

In FIG. 1, the device 110 is illustrated as including a central processing unit (CPU) 142, as well as a memory 144. Thus, the device 110 should be understood to be capable of various levels of computing capabilities, including, for example, processing or transmitting sensed data (in the case where the device 110 includes, or is associated with, a sensor). Additionally, the device 110 may include an antenna for transmitting data to and/or receiving data from other devices 108, 112, and 114, one of which may be a base station 114 of the network 102. The device can also include one or more services 146 that may be run autonomously by the device 110.

Although not specifically illustrated in FIG. 1 for the sake of clarity and brevity, it should be understood that all of the devices 108-114 also may include the same, additional, or alternative computing and communications capabilities, including, for example, the communication capability to form and participate in the smart item network 102, as shown, which may include, for example, a wireless network(s) and/or a peer-to-peer network(s). That is, it should be understood that the devices 108-114 may include other standard elements and features, not specifically illustrated in FIG. 1 for the sake of brevity, such as, for example, a (e.g., radio) transceiver and a local power supply or battery.

Thus, the smart item networks 102, 104, and 106 may be used to collect, process, filter, aggregate, or transmit data that may be useful to related business processes 120-140, and, more specifically, may be used to execute portions of the business processes (e.g., business logic), that are well-suited for (or benefit from) local execution. Specifically, in the example of FIG. 1, portions of a business processes/business logic deployed on the smart item network 102 may include a service 146 that is deployed on the device 112.

For example, the service 146 may represent an enabling service that, e.g., enables collaboration between two or more of the devices 108-114; or may represent a monitoring service that, e.g., monitors a local environmental parameter (e.g., a temperature, a humidity, a light flux, etc., and whether the local environmental parameter exceeds a defined value, and whether any action should be taken in response to the local environmental parameter exceeding the defined value); or may represent a location service that determines a location of the device, e.g., with respect to other devices, with respect to fixed objects, or with respect to geographic co-ordinates.

To integrate data from smart item networks 102, 104, and 106 into the backend enterprise applications 120-140, a middleware layer message routing engine 150 having a message handling layer 160 and a platform abstraction layer 161 can be implemented between the smart devices and the enterprise applications. The message handling layer 160 can include the XI 150. This middleware layer frees an application developer from having to design an application that is specifically compatible only with particular devices, and allows information generated by the smart devices 108-114 to be utilized by a variety of different enterprise applications 120-140.

The platform abstraction layer 161 provides a common view of smart devices that use various different communication technologies and protocols to overlaying layers and thereby manages the technical heterogeneity of different sensor network technologies. Therefore, at higher levels above the platform abstraction layer 161, an application need not conform to device specific communication protocols, message formats, or any other device specific data.

In one implementation, the platform abstraction layer 161 can include a Universal Plug and Play device architecture (UPnP) designed to achieve a vendor independent communication between smart items and processing systems (e.g., PCs, servers, and other computing systems). UPnP control protocols build upon open, Internet-based communication standards like SOAP or XML, and UPnP has been designed to support zero-configuration networking and automatic discovery of devices and their services. Thus, UPnP devices can dynamically join a network, convey their capabilities, and learn about the presence and capabilities of other available devices. Devices can also leave a network automatically without leaving any unwanted state behind.

To make use of information generated by the smart devices 108-114, the smart item networks 102, 104, and 106 can be connected to the enterprise applications 120-140 by the message handling layer 160. In the fortuitous case in which messages from smart items in a network 106 are communicated using technologies and protocols that are understood by the XI 150 of the message handling layer 160, the messages can be conveyed directly to the XI 150 for routing to various enterprise application 120-140. However, the XI 150 of the message handling layer also must be capable processing messages in the message formats provided by the platform abstraction layer 161 (e.g., messages from smart items 108-114) and messages that are provided in technology-specific protocols that do not communicate using the UPnP technology (e.g., from smart items in network 104).

Therefore, for the integration of UPnP devices and other non-UPnP platform devices, the message handling layer 160 can include an XI integration engine 164 that can process messages having different device technologies and protocols, such as UPnP and non-UPnP technologies and protocols and transform the incoming messages to a message format, (e.g., SOAP messages) that the XI 150 can process. For smart devices that use technologies and protocols that are not natively supported by the XI (e.g., devices in networks 102 and 104), a platform handler inside the integration engine 164 can convert the messages received from the smart items into a format that can be processed by the XI. For example, a UPnP handler 166 can process messages from UPnP-compatible devices, and a platform-specific handler 168 can process messages from other networks 104 having smart devices (e.g., TecO Particles) that use other non-UPnP protocols. A platform handler can be used for each different non-UPnP technology that should be integrated. For a network 106 that uses technologies and protocols (e.g., SOAP or HTTP) that are natively supported by the XI, messages can bypass the integration engine 164 en route to the XI.

As described above, the XI is often used to support the exchange of messages between enterprise applications 120-140, and in such cases the number messages routed by the XI in a period of time (i.e., the throughput of the XI) can be relatively low, while the size of individual messages can be relatively high. For example, when the XI 150 is used to route purchase orders from one enterprise application to another enterprise application, each message may contain hundreds or thousands of lines of data, but multiple messages generally would not be sent with a high degree of parallelism. In such a case, the XI 150 may be designed to process a relatively low throughput of the relatively large messages.

In another implementation, however, the XI 150 may be used to route messages between a smart items network 102, 104, or 106 and an enterprise application 120-140, in which case very many short messages originating in a smart items network 102 may flood the XI for short periods of time. For example, the smart items network 102 may exist in a warehouse that contains a large number of items, each of which includes its own RFID tag that can transmit data through the smart items network 102. If an enterprise application 128 makes a request to the network 102 for the actual stock of goods, every RFID-tagged item might send its data to the application 128 over the XI. Each message might contain only a small amount of information (e.g., a single byte to indicate that the tagged item exists), however, the flood of many nearly simultaneous messages to the XI may cause processing difficulties for the XI. The challenge of processing many nearly simultaneous messages may be exacerbated by the fact that each message received from a smart items network may include a relatively large SOAP header (e.g., 40 bytes) but a relatively small payload (e.g., 1 byte), such that processing power of the XI is devoted primarily to merely routing the messages but with relatively low data throughput. In another example, the smart items network 102 can exist in a building that includes a large number of smart item environmental sensors that can transmit data from the smart items network 112 to one or more enterprise applications 120-140 over the XI 150. Messages might be sent automatically from sensors in the smart items network, but the rate at which sensors send messages may depend on environmental factors. For example, far more messages may be sent from the network 102 over the XI 150 just after the building catches fire than when environmental factors are stable within the building.

Thus, to handle incoming messages from one or more smart items networks 102, 104, and 106 the message handing layer 160 may include a traffic-shaping layer 170 that adaptively shapes the pattern of incoming traffic to the XI 150. The traffic-shaping layer 170 can include a message queue 172 and processors 174, 176, 178, and 180 that operate in parallel to route from the smart items network 102 to an enterprise application 120-140 through different parallel channels 171 between the traffic shaping layer 170 and the XI 150. Messages can be routed synchronously between the smart items network 102 and an enterprise application 120-140, i.e., a message can be sent from the smart items network 102 to a receiving enterprise application 120-140, and the enterprise application can return a message to the smart items network confirming receipt of the message before a new message is allowed to be routed from the network to the application.

The queue 172 can receive messages sent directly from a smart items network 106 or sent from a smart items network 102 or 104 via an integration engine 164. Messages can be extracted from the queue 172 and processed by different processors 174-180 and fed by the processors to the XI 150. Processors 174-180 can be different processor circuits (e.g., CPUs, digital signal processors (DSPs), application specific integrated circuits (ASICs), or other electronic processors), or can be different processing threads of a multi-threaded processor, or can be a combination of different physical processors and different processing threads.

Figure 4:
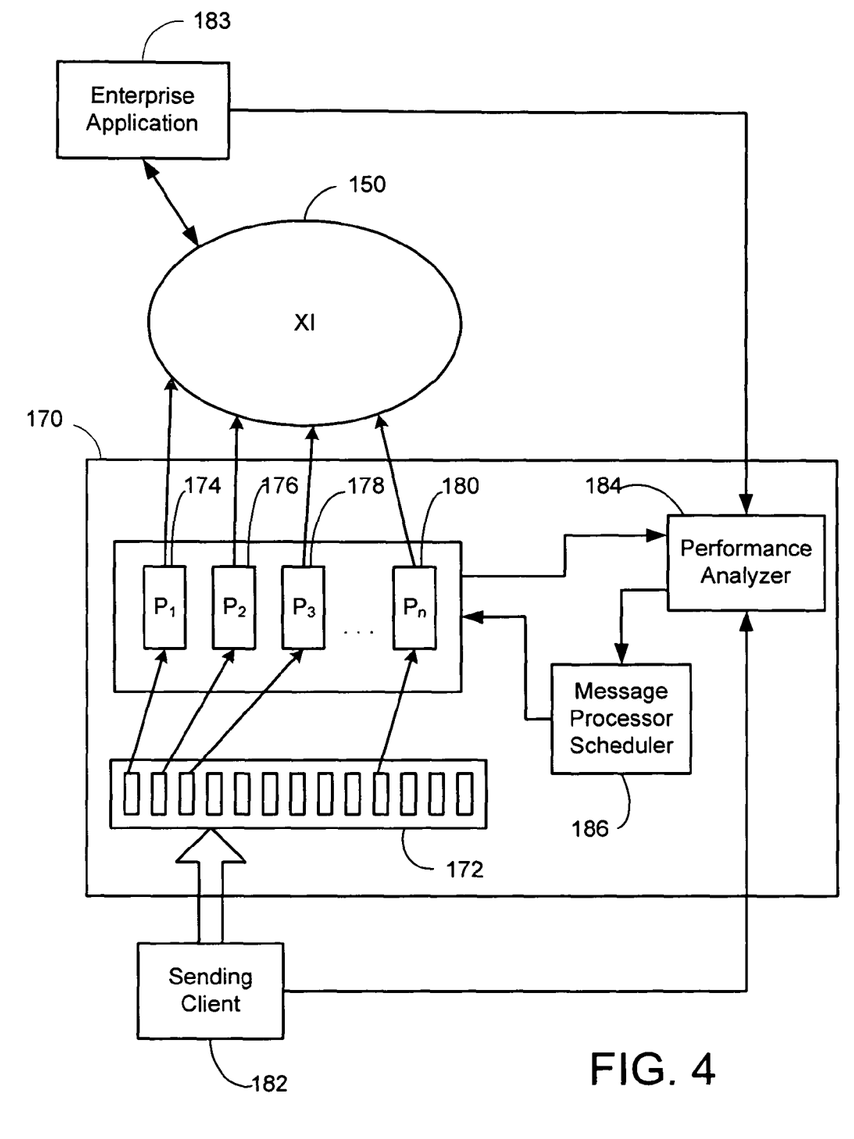
FIG. 4 is a schematic diagram of a system for shaping traffic flow from a smart items network to a message handing layer.

FIG. 4 is a schematic diagram of a system for shaping traffic flow from a smart items network to a message handing layer. A large volume of messages may be sent from a network of smart items 182 to the queue 172 of a traffic-shaping layer 170 within a message handing layer 160. As explained in more detailed below, a quality of service parameter of the message handing layer 160 (as measured by, for example, the message throughput rate, the percentage of message that are successfully delivered, etc.) can be monitored by a performance analyzer 184, and, based on the results of the performance analysis, a message scheduler 186 can increase or decrease the number of processors to maintain or improve the quality of service. For example, if the number of messages being put through the XI is relatively low, the throughput rate may be constrained by the number of parallel processors 174-180 that feed messages to the XI, and it may be advantageous to increase the number of processors that feed messages to the XI. On the other hand, if the number of messages arriving at the XI in a particular time period is so great that it overwhelms the XI, the XI may discard messages, or the performance of the XI may slow down, or the XI could crash, in which case it may be advantageous to reduce the number of processors that feed messages to the XI. Such a scenario could correspond to a leaky bucket model of traffic flow in which too much data traffic arrives, and the bucket overflows, thus causing data messages to be discarded. In either case, the performance of the XI can be analyzed by empirically measuring a quality of service parameter, and the number of processors may be increased or decreased in response to the results of the performance analysis.

To monitor the throughput of the XI 150, when a message is sent from the sending system 182, the sending system 182 can add a timestamp to a message before sending the message to the XI 150. The XI 150 then can send the message to the receiving application 183 that can process and analyze the message. In one implementation, a servlet within the receiving application 183 can determine the arrival time of the message at the receiving application 183 then subtract the time of the timestamp from the arrival time to determine the time taken to deliver the message from the sender to the receiver. The receiving application 183 can report this information to a performance analyzer 184, which can also receive information about the number of currently active processors. The performance analyzer 184 can use this information to analyze the performance of the XI. For example, the performance analyze 184 can determine an average throughput of the XI by dividing the number of messages routed in a period of time by the length of the time period. In another example, to determine the percentage of messages delivered successfully, the performance analyzer 184 can receive information from the sending application 182 about the number of messages sent from the sending application and can compare this number to the number of messages received by the receiving application in the same or a slightly-later time period.

In another implementation, communication between the sending system 182 and the receiving application 183 may be synchronous, i.e., the sending system must wait to receive a confirmation message from the receiving application 183 before it can send another message. Information can be provided from the processors 174, 176, 178, and 180 that can be used to determine transmission times of messages passing through the traffic shaping layer 170, and this information can be passed to the performance analyzer 184, which can calculate an average message throughput rate from individual transmission times. Depending on whether the addition or subtraction of a marginal processor improves the quality of service of the XI, the performance analyzer 184 can instruct the message process scheduler 186 to increase, decrease, or maintain the number of currently active processors. Thus, the performance analysis and message processor scheduling can be performed entirely within the traffic shaping layer 170, and the sending client 182 and the enterprise application 183 may remain ignorant of the existence of the traffic-shaping layer.

The number of processors or processor threads that optimizes a quality of service parameter (e.g., a throughput or a transmission success rate) can depend on particularities of an individual XI installation. For example, in a cluster environment with several CPUs and a very large amount of memory, the number of processor threads that optimize a throughput value can differ from the optimal number of processor threads in a single CPU environment. Furthermore, the number of processors or processor threads that optimizes a quality of service parameter for a particular XI installation may change, e.g., depending on the dynamic load on the XI caused by other integration scenarios (i.e., the exchange of messages between different enterprise applications 120-140. Thus, the number of sending processes 172-180 can adapt dynamically to optimize a performance criteria of the XI.

Figure 5:
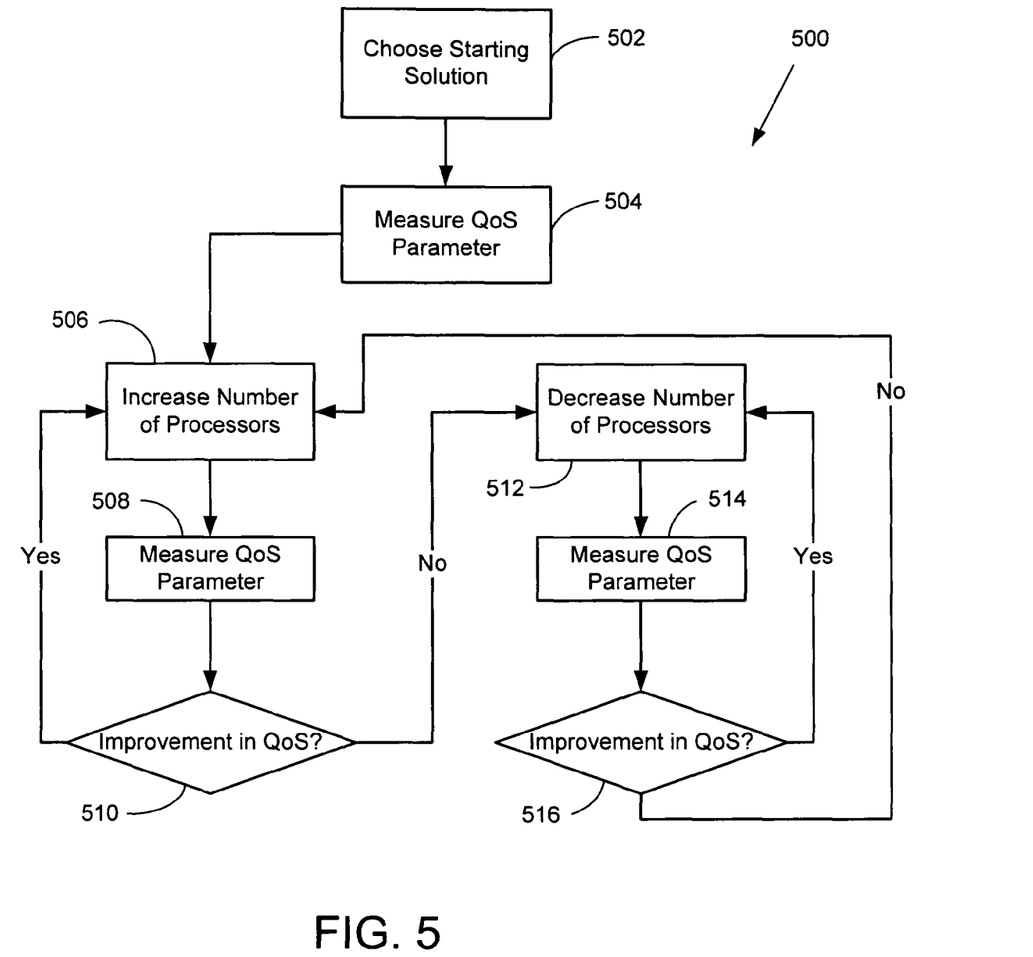
FIG. 5 is a flow chart of a process for managing a quality of service of interactions between smart items networks and enterprise applications.

Thus, rather than attempting to calculate a priori a number of sending processors 174-180 to optimize the performance of the XI, various optimization strategies can be applied to determine empirically the optimal number of processors for a given configuration at a given time. For example, as shown in FIG. 5, a local optimization process 500 can be used. The process begins by choosing a starting number of processors (step 502). Then, a quality of service parameter is measured (step 504), the number of processors is varied, and the effect of the change in the number of processors on the quality of service parameter is determined. Based on the effect of the new number of processors on the quality of service the number of processors can be further varied. For example, the number of processors can be increased (step 506), and the quality of service parameter can be measured again (step 508). If the increase in the number of processors results an improvement in the performance of the XI (as measured by a quality of service parameter) (decision 510), the number of processors can be further increased (step 506), but if an improvement is not noted, then the number of processors can be decreased (step 512), and the quality of service parameter can be measured again (step 514).

Generally it would seem that decreasing the number of processors would decrease the throughput of the XI, but, as explained above, this need not always be the case. However, by decreasing the number of processors (step 512) only after it has been determined (decision 510) that increasing the number of processors results in lower performance of the XI, the decrease in the number of processors can have a relatively high probability of improving the performance of the XI.

If the decrease in the number of processors results in an improvement in the performance of the XI (as measured by a quality of service parameter) (decision 516) then the number of processors can be further reduced (step 512), but if the performance decreases then the number of processors can be increased (step 506).

It should be understood that in this context the traffic-shaping techniques described herein can be implemented using a variable number of processor or processor threads. Generically, in this context "processors" can be used to describe both physical processors and processors threads, and that a variable number of processor threads can be selected from a processor pool to route messages from a smart items network 102 to the XI 150.

Referring again to FIG. 1, the traffic-shaping layer 170 can include a message aggregation engine 190 that can receive a plurality of messages from the message queue 172 that are destined for a single enterprise application and combine the messages into a single aggregate message 192 prior to routing to the XI 150. The aggregation engine 170 can buffer messages and then can combine the data payloads of the messages into a single message prior 192 to routing to the XI. Thus, many relatively small messages can be combined into one larger message, which may conserve processing resources and accelerate message transmission, especially when a large volume of relatively small messages are routed through the XI from a smart items network to an enterprise application.

Figure 6:
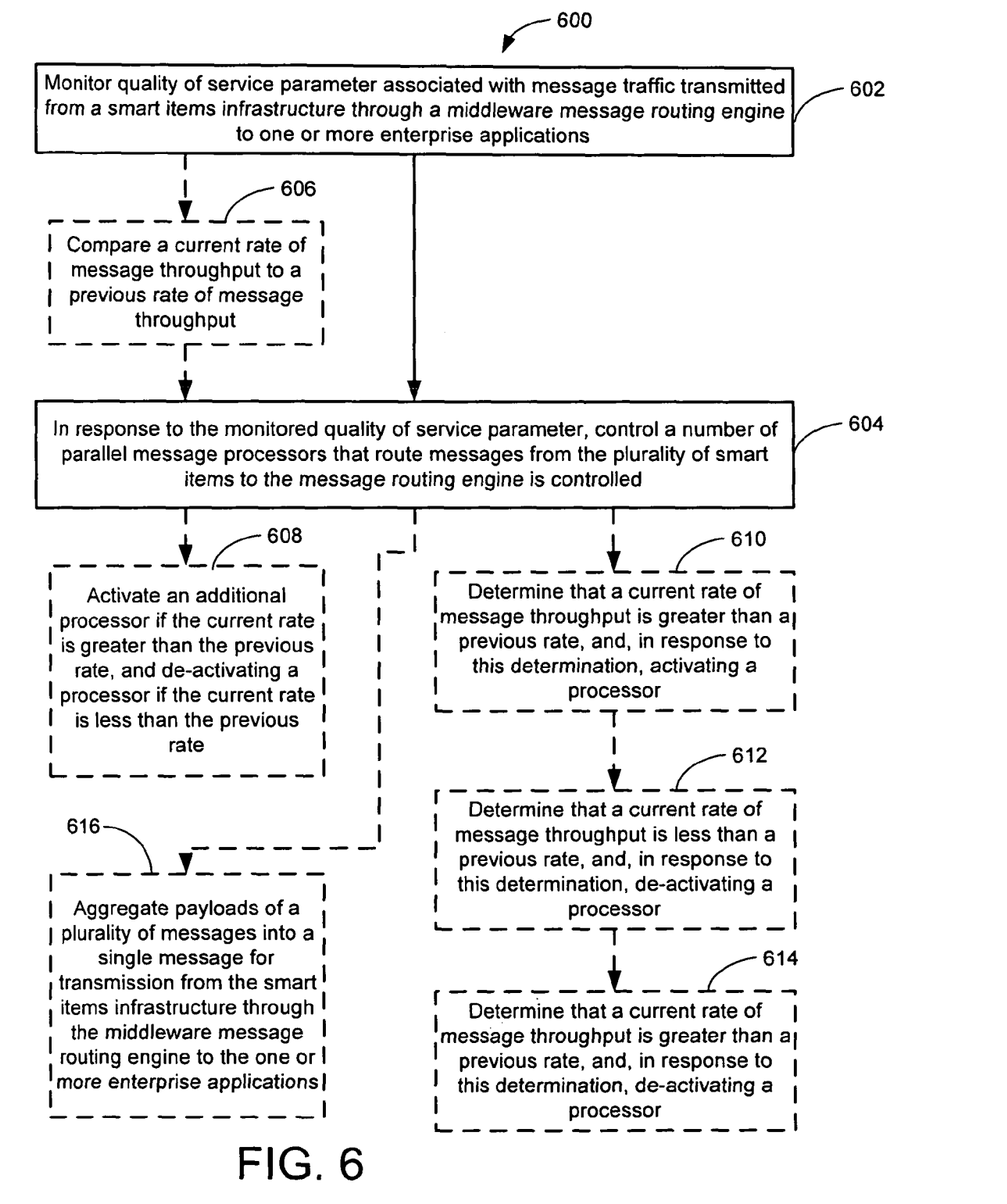
FIG. 6 is another flow chart of a process for managing a quality of service of interactions between smart items networks and enterprise applications.

FIG. 6 is a schematic flow chart of a process 600 for adaptively managing the quality of service of interactions between a smart item network and an enterprise applications. A quality of service parameter associated with message traffic transmitted from a smart items infrastructure through a middleware message routing engine to one or more enterprise applications is monitored (step 602). The smart items infrastructure can include, for example, a plurality of smart items, and the message traffic can be synchronous message traffic. In response to the monitored quality of service parameter, a number of parallel message processors that route messages from the plurality of smart items to the message routing engine is controlled (step 604).

The quality of service parameter can be a rate of message throughput between the smart items infrastructure and the one or more enterprise applications. In one implementation, monitoring the rate of message throughput can include comparing a current rate of message throughput to a previous rate of message throughput (step 606), and controlling the number of parallel message processors in response to the monitored rate of message throughput can include activating an additional processor if the current rate is greater than the previous rate, and de-activating a processor if the current rate is less than the previous rate (step 608). The additional processor may be added only if the difference between the current rate and the previous rate is greater than a predetermined threshold rate or if the difference between the current rate and the previous rate, divided by the previous rate is greater than a predetermined threshold ratio. By requiring that a threshold be exceeded before an additional processor is activated, the number of processors is not changed unless it its activation would have a significant effect on the performance of the XI.

In another implementation, controlling the number of parallel message processors in response to the monitored rate of message throughput can include determining that a current rate of message throughput is greater than a previous rate, and, in response to this determination, activating a processor (step 610), and then determining that a current rate of message throughput is less than a previous rate, and, in response to this determination, de-activating a processor (step 612) and then, determining that a current rate of message throughput is greater than a previous rate, and, in response to this determination, de-activating a processor (step 614). The additional processor may be activated or de-activated only if the absolute value of the difference between the current rate and the previous rate is greater than a predetermined threshold rate or if the absolute value of the difference between the current rate and the previous rate, divided by the previous rate is greater than a predetermined threshold ratio. By requiring that a threshold be exceeded before an additional processor is activated, the number of processors is not changed unless it its activation would have a significant effect on the performance of the XI.

In another implementation, payloads of a plurality of messages can be aggregated into a single message for transmission from the smart items infrastructure through the middleware message routing engine to the one or more enterprise applications (step 616).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
routing messages from a first enterprise application to a second enterprise application through a middleware message routing engine of a middleware layer, wherein the middleware layer is adapted to map a first message structure of a message received from the first enterprise application to a second message structure of a message destined for the second enterprise application;
receiving smart item messages transmitted from a smart items infrastructure that includes a plurality of smart items into a queue of a message handing layer;
extracting smart item messages from the queue into a plurality of message processors of the message handing layer, wherein the message processors are configured to route smart item messages from the plurality of smart items to the message routing engine, and wherein the message routing engine is adapted to map a message structure of a smart item message to a message structure of a message destined for one or more enterprise applications;
monitoring a quality of service parameter associated with the smart item message traffic transmitted from the plurality of smart items through the middleware message routing engine to the one or more enterprise applications; and
controlling, in response to the monitored quality of service parameter, a number of parallel message processors that route messages from the plurality of smart items to the message routing engine.

2. The method of claim 1, wherein the smart item message traffic is transmitted synchronously from the smart items infrastructure to the one or more enterprise applications.

3. The method of claim 1, wherein the quality of service parameter is a rate of smart item message throughput between the smart items infrastructure and the one or more enterprise applications.

4. The method of claim 3,
wherein monitoring the rate of smart item message throughput comprises comparing a current rate of message throughput to a previous rate of message throughput, and wherein controlling the number of parallel message processors in response to the monitored rate of smart item message throughput comprises activating an additional processor if the current rate is greater than the previous rate, and de-activating a processor if the current rate is less than the previous rate.

5. The method of claim 3,
wherein monitoring the rate of smart item message throughput comprises comparing a current rate of message throughput to a previous rate of message throughput, and
wherein controlling the number of parallel message processors in response to the monitored rate of smart item message throughput comprises:
   determining that a current rate of smart item message throughput is greater than a previous rate, and, in response to this determination, activating a processor;
   and then, determining that a current rate of smart item message throughput is less than a previous rate, and, in response to this determination, de-activating a processor;
   and then, determining that a current rate of smart item message throughput is greater than a previous rate, and, in response to this determination, de-activating a processor.

6. The method of claim 1, wherein the quality of service parameter is a rate of successful message transmission between the smart items infrastructure and the one or more enterprise applications.

7. The method of claim 1, further comprising aggregating payloads of a plurality of smart item messages into a single message for transmission from the smart items infrastructure through the middleware message routing engine to the one or more enterprise applications.

8. A computer program product, tangibly embodied on computer-readable media, the computer program comprising computer-executable instructions for causing a data processing apparatus to:
   route messages from a first enterprise application to a second enterprise application through a middleware message routing engine of a middleware layer, wherein the middleware layer is adapted to map a first message structure of a message received from the first enterprise application to a second message structure of a message destined for the second enterprise application;
   receive smart item messages transmitted from a smart items infrastructure that includes a plurality of smart items into a queue of a message handing layer;
   extract smart item messages from the queue into a plurality of message processors of the message handing layer, wherein the message processors are configured to route smart item messages from the plurality of smart items to the message routing engine, and wherein the message routing engine is adapted to map to message structure of a smart item message to a message structure of a message destened for one or more enterprise applications;
   monitor a quality of service parameter associated with the smart item message traffic transmitted from the plurality of smart items through the middleware message routing engine to the one or more enterprise applications; and
   control, in response to the monitored quality of service parameter, a number of parallel message processors that route messages from the plurality of smart items to the message routing engine.

9. The computer program product of claim 8, wherein the smart item message traffic is transmitted synchronously from the smart items infrastructure to the one or more enterprise applications.

10. The computer program product of claim 8, wherein the quality of service parameter is a rate of smart item message throughput between the smart items infrastructure and the one or more enterprise applications.

11. The computer program product of claim 10,
wherein monitoring the rate of smart item message throughput comprises comparing a current rate of smart item message throughput to a previous rate of message throughput, and
wherein controlling the number of parallel message processors in response to the monitored rate of smart item message throughput comprises activating an additional processor if the current rate is greater than the previous rate, and de-activating a processor if the current rate is less than the previous rate.

12. The computer program product of claim 10,
wherein monitoring the rate of smart item message throughput comprises comparing a current rate of smart item message throughput to a previous rate of message throughput, and
wherein controlling the number of parallel message processors in response to the monitored rate of message throughput comprises:
   determining that a current rate of smart item message throughput is greater than a previous rate, and, in response to this determination, activating a processor;
   and then, determining that a current rate of smart item message throughput is less than a previous rate, and, in response to this determination, de-activating a processor;
   and then, determining that a current rate of smart item message throughput is greater than a previous rate, and, in response to this determination, de-activating a processor.

13. The computer program product of claim 8, wherein the quality of service parameter is a rate of successful smart item message transmission between the smart items infrastructure and the one or more enterprise applications.

14. The computer program product of claim 8, further comprising computer-executable instructions for causing the data processing apparatus to aggregate payloads of a plurality of messages into a single message for transmission from the smart items infrastructure through the middleware message routing engine to the one or more enterprise applications.

15. A system comprising:
   a queue of a message handing layer configured for receiving smart item messages from a smart items infrastructure and delivering the smart item messages to a middleware message routing engine for routing to one or more enterprise applications, wherein the middleware message routing engine is adapted to map a first message structure of a message received from the first enterprise application to a second message structure of a message destined for the second enterprise application;
   a plurality of parallel message processors configured for receiving smart item messages from the queue and for routing the smart item messages through the middleware message routing engine in parallel to one or more enterprise applications;
   a performance analyzer engine configured to monitor a quality of service parameter associated with smart item message traffic transmitted from the smart items infrastructure through the middleware message routing engine to the one or more enterprise applications; and a message processor scheduler configured to control, in response to the monitored quality of service parameter, a number of parallel message processors that route messages from the smart items infrastructure to the message routing engine.

16. The system of claim 15, wherein the smart item message traffic is transmitted synchronously from the smart items infrastructure to the one or more enterprise applications.

17. The system of claim 15, wherein the quality of service parameter is a rate of smart item message throughput between the smart items infrastructure and the one or more enterprise applications.

18. The system of claim 17,
wherein the performance analyzer engine is further configured to compare a current rate of smart item message throughput to a previous rate of message throughput, and
wherein the message processor scheduler is further configured to activate an additional processor if the current rate is greater than the previous rate, and is configured to de-activate a processor if the current rate is less than the previous rate.

19. The system of claim 17,
wherein the performance analyzer engine is further configured to:
compare a current rate of smart item message throughput to a previous rate of message throughput; and
determine that a current rate of smart item message throughput is greater than a previous rate, and
wherein the message processor scheduler is further configured to:
activate a processor in response to a determination by the performance analyzer engine that a current rate of message throughput is greater than a previous rate;
and then, de-activate a processor in response to a determination by the performance analyzer engine that a current rate of message throughput is less than;
and then, de-activate a processor in response to a determination by the performance analyzer engine that a current rate of message throughput is greater than a previous rate.

20. The system of claim 15, further comprising an aggregation engine configured to aggregate payloads of a plurality of smart item messages into a single message for transmission from the smart items infrastructure through the middleware message routing engine to the one or more enterprise applications.

* * * * *